United States Patent [19]

Gilson

[11] 4,323,285
[45] Apr. 6, 1982

[54] DUAL THRUST BEARING FOR A SHAFT

[75] Inventor: Dale P. Gilson, Bellflower, Calif.

[73] Assignee: Kobe, Inc., Commerce, Calif.

[21] Appl. No.: 130,280

[22] Filed: Mar. 14, 1980

[51] Int. Cl.³ .............................................. F16C 17/06
[52] U.S. Cl. ..................................... 308/160; 308/162
[58] Field of Search .................. 308/139 R, 146, 160, 308/161, 162, 227

[56] References Cited

U.S. PATENT DOCUMENTS 3,982,797  9/1976  Tschirky et al. .................... 308/139

Primary Examiner—Frederick R. Schmidt
Attorney, Agent, or Firm—William C. Norvell, Jr.

[57] ABSTRACT

A dual thrust bearing arrangement is provided for a shaft subject to axial thrust which accomplishes, under all conditions, an exact division of the total thrust on the shaft into two equal components which are respectively applied to the thrust bearings.

10 Claims, 3 Drawing Figures

DUAL THRUST BEARING FOR A SHAFT

BACKGROUND OF THE INVENTION

1. FIELD OF THE INVENTION:

This invention relates to a dual thrust bearing for a shaft, and particularly, a thrust bearing for supporting a down hole well pump shaft.

2. DESCRIPTION OF THE PRIOR ART:

Down hole pumping units have long been employed in oil wells. Because of the diametrical constraints of the oil well casing, it has been the common practice in deep wells to provide a series of axially aligned pumping units mounted on and driven by a common shaft in order to generate sufficient pressure to effect the elevation of the well fluids to the surface. In any such pumping apparatus, a considerble axial thrust force is developed by each of the pumping units and, when a large number of such units are disposed in series, the resultant thrust load becomes larger than that which can be conveniently handled by a single thrust bearing, taking into account the diametrical constraints imposed by oil well casing.

It has therefore been necessary to insert a plurality of thrust bearings in spaced relationship along the length of a multi-unit pump. However, each such thrust bearing requires special mounting provisions relative to the pump housing and/or the well casing. Moreover, there is no assurance that the load imposed on each thrust bearing will be substantially equal because the tolerance variations that are inherent in a multi-unit string of pumps can result in an excessive load being imposed on a few of the bearings and a relatively light load on the remainder.

SUMMARY OF THE INVENTION

This invention provides a dual thrust bearing support for a down hole well pump shaft that is subjected to substantial axial thrust in its normal operation, characterized by an apparatus that precisely distributes one half of the total thrust to each of the two dual thrust bearings. The dual thrust bearing apparatus embodying this invention comprises a pair of thrust bearings which are mounted in axially adjacent relationship in a suitable housing. Each bearing includes a stationary annular thrust absorbing element and an annular thrust receiving rotary element. The shaft to be supported by the bearings is rotatable in the annular thrust receiving rotary elements but is axially shiftable relative thereto. The shaft is provided with a hollow central portion which extends axially to lie within the confines of both of the annular rotary thrust receiving elements.

Within the hollow central shaft portion, a pair of axially shiftable thrust transmitting elements are mounted. The one thrust transmitting element is connected by a radially disposed set screw which passes outwardly through an axially extending slot in the shaft wall to one of the annular thrust receiving rotary elements. The second thrust transmitting element is connected by a second set screw passing through another axial slot in the shaft wall to the other of the annular thrust receiving rotary elements. The axial end faces of the thrust transmitting elements are of equal area. An appropriate connection having the properties of an elastomeric mass, is then provided between the radial end wall of the shaft hollow portion and an axial end face of each of the thrust transmitting elements, to transmit the thrust force on the shaft equally to the thrust transmitting elements, and hence equally to the two thrust bearings.

The arrangement of this invention therefore insures that each of the dual thrust bearings may be loaded to its full capacity, without incurring any risk that one or the other of the thrust bearings will be overloaded due to an imbalance in the thrust load imparted to the particular bearing. Thus, the number of thrust bearings required to support a given shaft may be significantly reduced, while at the same time the total life and overall peformance of all of the bearing units are substantially improved due to the elimination of overloads on certain individual thrust bearing elements.

DESCRIPTION OF THE PREFERRED EMBODIMENTS

Figure 2:
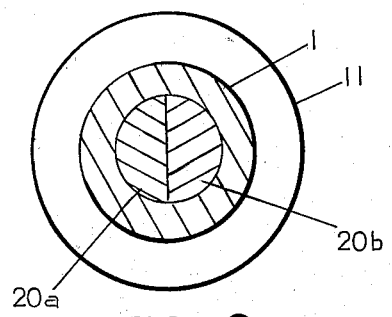
FIG. 2 is a sectional view taken on the plane 2—2 of FIG. 1.

Referring to the drawings, wherein similar numerals represent identical components, a hollow shaft 1, suitable for driving a down hole series of pumps, passes through a pair of axially adjacent identical thrust bearings 10. Each thrust bearing 10 comprises annular stationary elements 10a and 10b adapted to be secured in conventional fashion to a pump housing (not shown) so as to mount the thrust bearings 10 in axially adjacent relationship. Each thrust bearing 10 further comprises an annular thrust receiving rotary element 10c which rotates between the annular stationary thrust receiving elements 10a and 10b and transmits a portion of the thrust developed by the shaft 1 thereto. Each annular thrust receiving rotary element 10c may also include as part of its assembly an axially extending sleeve 11. Sleeve 11 defines a cylindrical bore 11a within which the pump shaft 1 is freely rotatable and also axially slidable. Each sleeve 11 may be secured to the corrsponding rotary thrust receiving element 10c for co-movement by an internally threaded collar 12 which is engageable with threads 11b provided on a reduced diameter end of the sleeve 11 and clamps the thrust absorbing element 10c against a radial shoulder 11c provided on each sleeve 11.

The hollow bore 1a of the shaft 1 is plugged at two axially-spaced points by filler plugs 3 which are inserted in the shaft and pinned thereto by crosspins 3a. The plugs 3 thus define a cylindrical chamber 4 between them which extends within a portion of each of the sleeves 11, or, in broader terms, within a portion of each thrust receiving rotary element assemblage.

Within the chamber 4 thus defined, a pair of thrust transmitting elements 20 are provided. In the modification of this invention illustrated in FIGS. 1 and 2, the thrust transmitting elements 20 comprise two identical semi-cylindrical rods 20a and 20b having equal area end faces 20c and 20d respectively. The one rod 20a is connected by a radial set screw 21 to one of the sleeves 11, passing through an axially extending slot 1c provided in the shaft 1 for this purpose. Thus, the one thrust receiving annular element 10c is rigidly secured to the one thrust transmitting element 20a. Similarly, the other thrust transmitting element 20b is connected by a radial set screw 23 passing through an axial slot 1d in the shaft 1 to the other sleeve 11, and thus to the other thrust receiving rotary element 10c of the second thrust bearing 10. Obviously, if the thrust forces transmitted by each of the thrust transmitting elements 20a and 20b are identical, then the thrust absorbed by each of the thrust bearing units 10 will likewise be equal.

In accordance with this invention, one half of the total thrust on the shaft 1 is applied to each of the end faces 20c and 20d of the thrust transmitting elements 20a and 20b by interposing a connection represented by a U-shaped compression spring 22 disposed between the respective end faces and the filler plug 3.

A semi-toroidal recess 3c is provided in the lower face 3b of filler plug 3 to receive the bight portion of U-shaped spring 22, and the two ends 22a and 22b of spring 22 are inserted in vertical holes 20e and 20f respectively in the end faces of 20c and 20d thrust transmitting elements 20a and 20b. It follows that any force on one end of spring 22 will produce an equal force in the other spring end, both of which transmit their forces to the thrust transmitting elements. Hence, the thrust load imposed on the shaft 1 is transmitted in equal halves respectively to the thrust transmitting elements 20a and 20b and thence to the rotary annular thrust receiving elements 10c of the two thrust bearings 10.

In order to eliminate unnecessary vibration of the thrust transmitting elements 20a and 20b, it has been found expedient to provide an additional resilient means, comprising a pair of springs 24 operating between the other end faces 20g and 20h respectively of the thrust transmitting elements 20a and 20b and the second filler plug 3 to maintain a constant and equal bias on the thrust transmitting elements urging them toward the resilient thrust transmitting means 22. To insure that springs 24 do not disturb the thrust balance, the bottom ends thereof engage recesses 6a and 6b provided in a rocker seat 6 which is balanced on an upstanding fulcrum 3f formed on the top face of the lower filler plug 3.

It will be noted that the described dual bearing construction will absorb thrust in either direction, although in pump applications, only a unidirectional thrust is normally encountered.

It will also be apparent to those skilled in the art that many different forms of force transmitting elements may be provided between the end face 3b of the filler block 3 and the end faces 20c and 20d of the thrust transmitting elements 20a and 20b so long as the total force is equally divided and equally imposed on the two thrust transmitting elements. Thus, as will be more specifically described in connection with the modification of FIG. 3, a mass of elastomeric material may be substituted for the compression spring 22. Similarly, a mass of fluid could be interposed between the respective end faces 29c and 20d of the thrust transmitting elements 20a and 20b and the end face 3b of the filler plug 3, so long as adequate seals were provided to prevent undesired leakage of such fluid. Therefore, to generically describe the type of connection desired between the shaft 1, represented by the radial end face 3b of the filler block 3, and the end faces of the thrust transmitting elements 20a and 20b, the term elastomeric mass will be hereinafter utilized.

Figure 3:
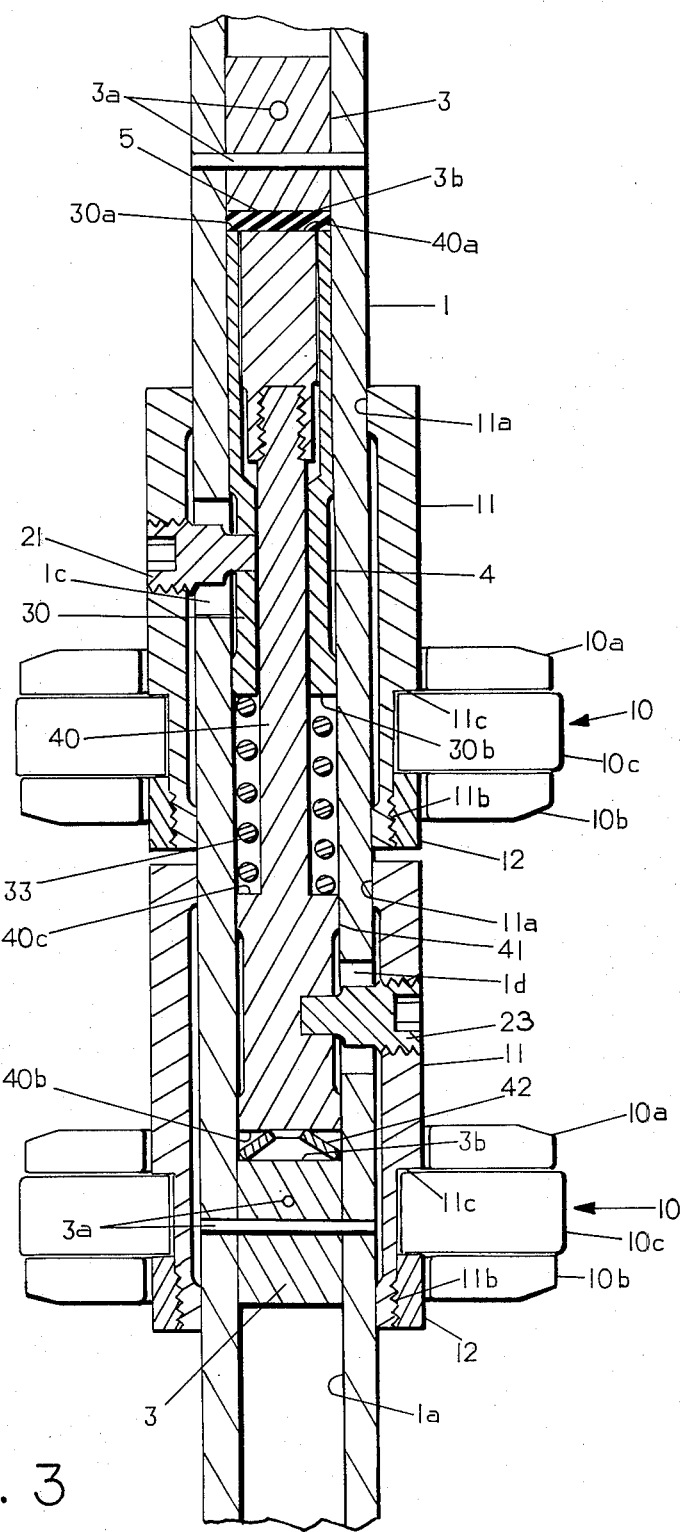
FIG. 3 is a view similar to FIG. 1 but illustrating a preferred modification of this invention wherein the resilient connection between the shaft and the thrust transmitting elements is provided by a mass of elastomeric material.

Referring now to the modification of FIG. 3, the pair of thrust bearings 10 are provided and mounted in surrounding relationship to the hollow shaft 1 in the same manner as heretofore described. Similarly, the bore 1a of shaft 1 is sub-divided by filler plugs 3 to form a cylndrical chamber 4 which extends within the confines of the rotary thrust receiving assemblages of the thrust bearings 10. In this modification, however, the thrust transmitting elements comprise a sleeve member 30 within which a rod member 40 is axially slidably mounted. The wall of sleeve member 30 is engaged by the radial set screw 21 which traverses an axial slot 1c in the wall of shaft 1 and engages the sleeve 11 of upper bearing 10. Likewise, the rod element 40 terminates at its lower end in an enlarged cylindrical portion 41 and receives the inner end of the radial set screw 23 which passes through the slot 1d in the shaft 1, and engages the sleeve 11 of lower bearing 10. Thus the cylinder 30 and the rod 40 constitute thrust transmitting elements. The top end faces 30a and 40a of cylinder 30 and rod 40 respectively are designed so that their total areas are equal. A mass of elastomeric material 5 is then disposed between such end faces and the adjacent end face 3b of the filler plug 3. Since the total downward thrust forces carried by the shaft 1 are imparted to the elastomeric mass 5, and the mass 5 engages equal area end faces 30a and 40a of the cylinder element 30 and the rod element 40, it is obvious that the total thrust force on shaft 1 is equally divided and transmitted respectively in equal halves to the two thrust bearings 10.

In order to eliminate unnecessary vibration of the thrust transmitting elements 30 and 40, a Bellville spring 42 may be provided for the rod 40 operating between the end face 40b of the rod 40 and the adjacent end face 3b of the filler plug 3. A compression spring 33 may be provided to bias the cylinder sleeve 30 against the elastomeric mass 5, with the spring 33 operating between the end face 30b of the cylinder and the radial wall 40c provided on the rod 40.

Figure 1:
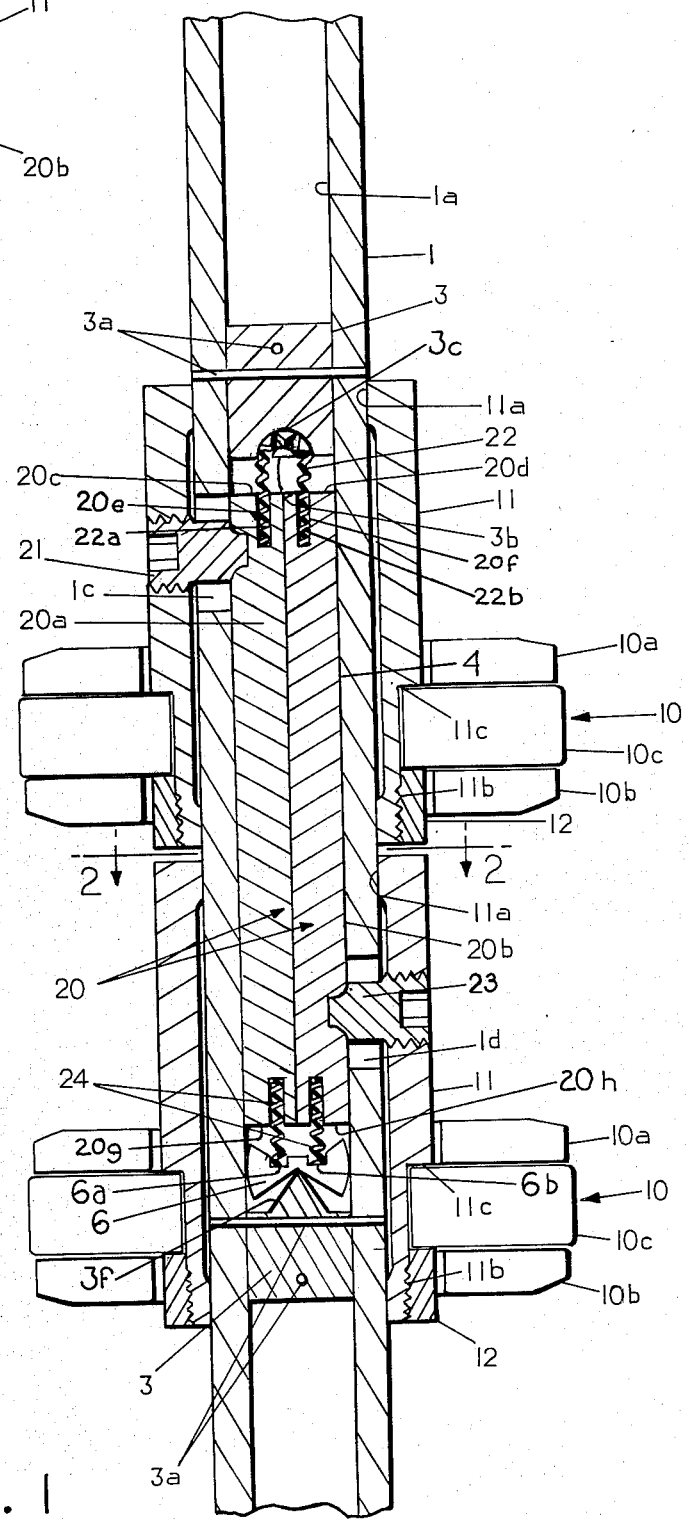
FIG. 1 is a schematic sectional view of a dual thrust bearing support arrangement for a shaft embodying one modification of this invention.

The operation of the modification of FIG. 3 is identical to that of FIG. 1 heretofore described and the total downward thrust forces on the shaft 1 are divided and applied in equal increments to the two thrust bearings 10. This construction is not, however, bi-directionally effective.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A dual thrust bearing support for a shaft comprising: a pair of axially adjacent thrust bearings, each bearing having a stationary annular thrust absorbing element adapted to be secured to a housing and an annular thrust receiving rotary element; a shaft rotatable in said annular thrust receiving rotary elements but axially shiftable relative thereto, said shaft having a hollow central portion; a first thrust transmitting member mounted in said hollow central shaft portion for relative axial movements; means for rigidly securing said first thrust transmitting member to one of said rotary thrust transmitting elements to transmit thrust force to the associated thrust absorbing element; a second thrust transmitting member mounted in said hollow central shaft portion for relative axial movements; means for rigidly securing said second thrust transmitting member to said other rotary thrust transmitting element to transmit thrust force to the associated thrust absorbing element; and means inter-connecting said shaft and each of said thrust transmitting members to transmit thrust force on said shaft equally to said thrust transmitting members.

2. The apparatus defined in claim 1 wherein said thrust transmitting members have approximately equal area end faces, and said last mentioned means comprises an elastomeric mass disposed between a radial surface on said shaft and the end faces of said thrust transmitting elements.

3. The apparatus defined in claim 2 plus resilient means operative between said shaft and said thrust transmitting members to bias said elements axially against said elastomeric mass.

4. The apparatus defined in claim 1, 2 or 3 wherein one of said thrust transmitting members comprises a sleeve slidable in said hollow shaft portion and the other thrust transmitting member comprises a rod slidable in said sleeve.

5. Apparatus defined in claim 1 wherein said last mentioned means comprises a plug in the hollow central portion of said shaft have a radial end face axially spaced from the end faces of said thrust transmitting elements, and a U-shaped compression spring having its bight portion slidably mounted in a recess in said plug radial surface and the ends of said spring respectively abutting the end faces of said thrust transmitting elements.

6. A dual thrust bearing support for a down hole well pump shaft comprising: a pair of axially adjacent thrust bearings, each bearing having a stationary annular thrust absorbing element adapted to be secured in a housing and an annular thrust transmitting rotary element; a pair of sleeves respectively secured to said annular rotary elements and disposed in axially adjacent relationship; a pump drive shaft rotatable in said sleeves but axially shiftable relative thereto, said drive shaft having a hollow central portion extending within both said sleeves; a first thrust transmitting member mounted in said hollow central shaft portion for relative axial movements; means including a first slot in said drive shaft for rigidly securing said first thrust transmitting member to one of said sleeves to transmit thrust force to the associated thrust bearing; a second thrust transmitting member mounted in said hollow central shaft portion for relative axial movements; means including a second slot in said drive shaft for rigidly securing said second thrust transmitting member to said other sleeve to transmit thrust force to the associated thrust bearing; and means inter-connecting said shaft and each of said thrust transmitting members to transmit thrust force on said shaft equally to said thrust transmitting members.

7. The apparatus defined in claim 6 wherein said thrust transmitting members have approximately equal area end faces, and said inter-connecting means comprises an elastomeric mass disposed between a radial surface on said shaft and the end faces of said thrust transmitting elements.

8. The apparatus defined in claim 7, further comprising resilient means operative between said shaft and said thrust transmitting members to bias said elements axially against said elastomeric mass.

9. The apparatus defined in claim 6, 7 or 8 wherein one of said thrust transmitting members comprises a sleeve slidable in said hollow shaft portion and the other thrust transmitting member comprises a rod slidable in said sleeve.

10. Apparatus defined in claim 6 wherein said last mentioned means comprises a plug in the hollow central portion of said shaft having a radial end face axially spaced from the end faces of said thrust transmitting elements, and a U-shaped compression spring having its bight portion slidably mounted in a recess in said plug radial surface and the ends of said spring respectively abutting the end faces of said thrust transmitting elements.

* * * * *